July 31, 1956 — J. J. SMITH — 2,756,486
METHOD OF CONNECTING SERVICE PIPE TO MAIN
Filed April 23, 1952 — 4 Sheets-Sheet 1

INVENTOR:
John J. Smith,
BY Cushman, Darby & Cushman
ATTORNEYS.

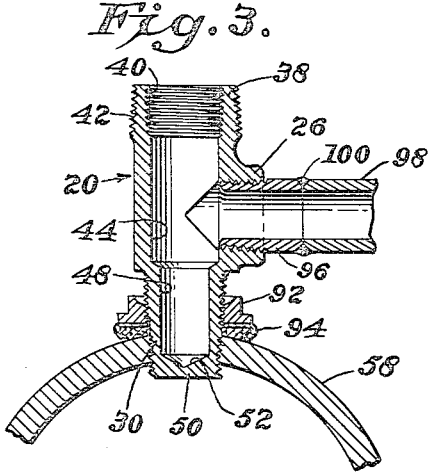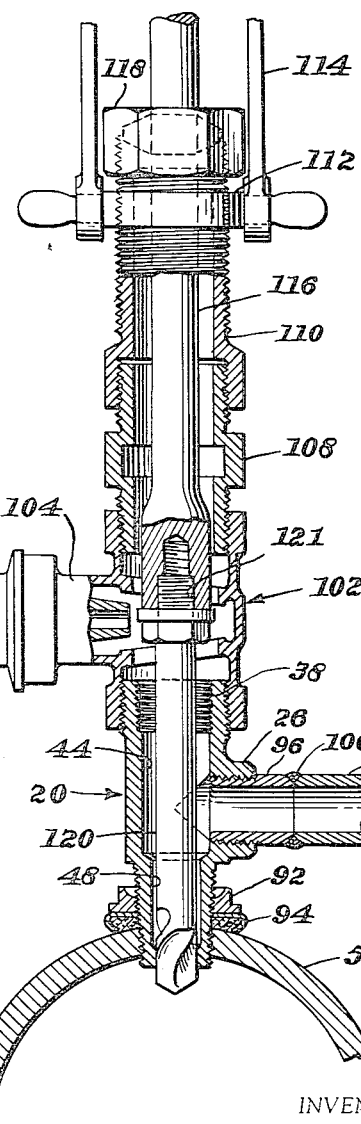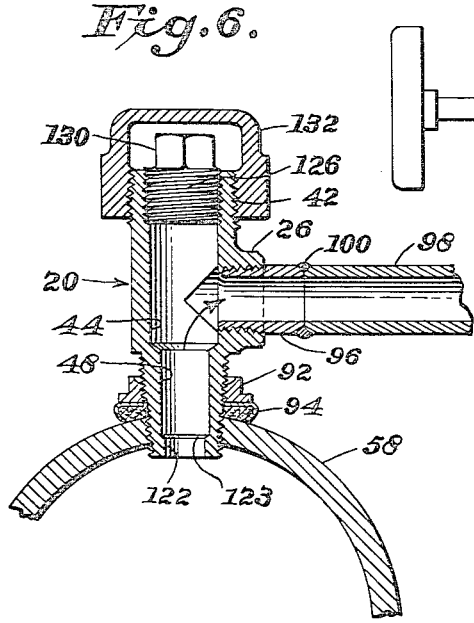

July 31, 1956　　　J. J. SMITH　　　2,756,486
METHOD OF CONNECTING SERVICE PIPE TO MAIN
Filed April 23, 1952　　　4 Sheets-Sheet 3

INVENTOR:
John J. Smith,
BY Cushman, Darby & Cushman
ATTORNEYS.

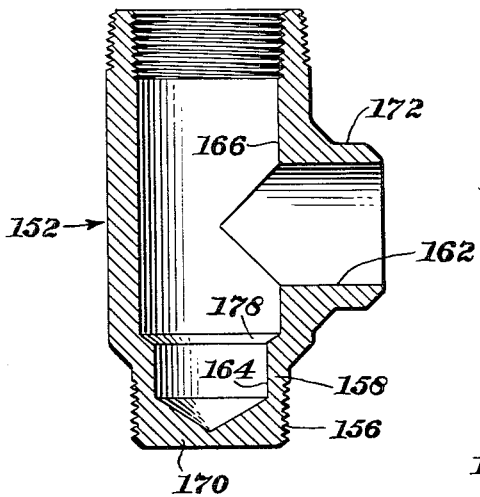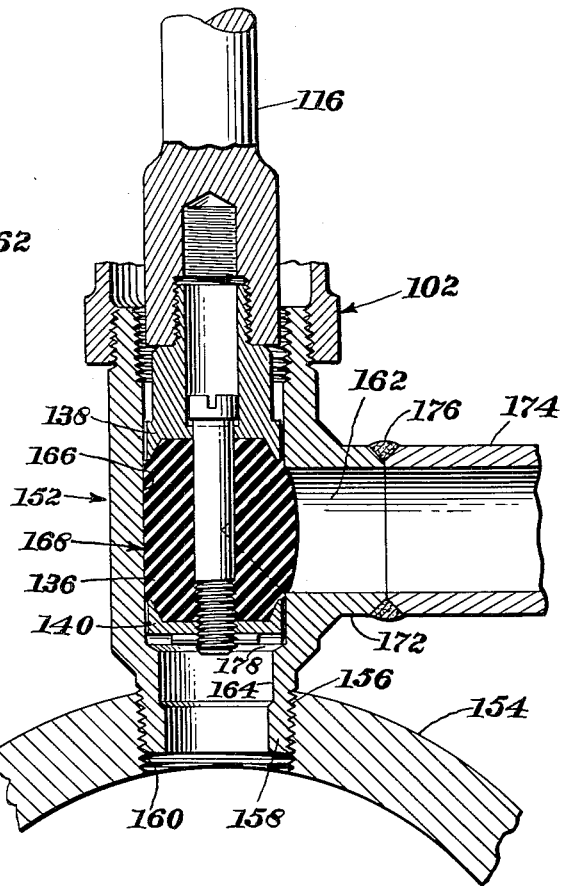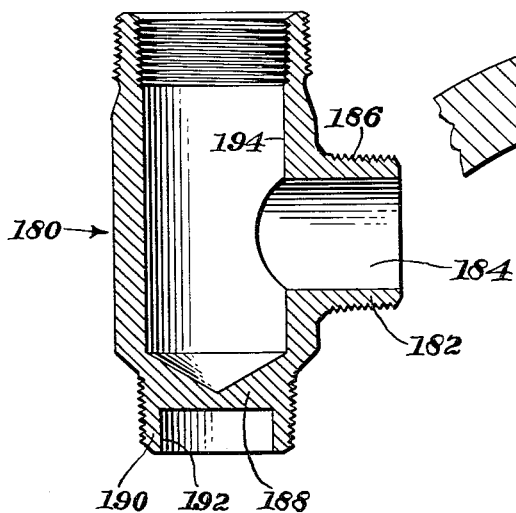

United States Patent Office 2,756,486
Patented July 31, 1956

2,756,486

METHOD OF CONNECTING SERVICE PIPE TO MAIN

John J. Smith, Decatur, Ill., assignor to Mueller Co., Decatur, Ill., a corporation of Illinois Application April 23, 1952, Serial No. 283,881

3 Claims. (Cl. 29—157)

This invention relates to an improved service T to be threaded into a tapped aperture in a main for connecting a branch or service pipe to the latter without loss of pressure, i. e., escape of fluid from the main to the atmosphere during the connecting operation. Further, the improved T is adapted for use with separate conventional means for shutting off the flow from the main to the service pipe when making repairs to the latter, such flow shut-off again being effected without loss of pressure.

Service T's of the type under consideration are well known in the art and T's have been developed which, by the use of an appropriate machine, may be inserted into a previously tapped opening in a main and have a service pipe connected thereto, all without escape of fluid to the atmosphere during the tapping, inserting, and connecting operations. Known T's of this nature, however, are provided with a valve between their inlet and side, or lateral, outlet in order to permit the service pipe to be connected thereto without escape of fluid to the atmosphere. This type of service T is relatively expensive, particularly when it is realized that gas and water utilities use vast numbers of such T's, so that a slight increment in the cost of the T eventually amounts to rather large sums of money.

Because of the additional expense of such valved service T's, the connection of a service pipe to a main frequently is effected by a non-valved T which permits fluid to escape from the line to the atmosphere during the connecting operation. When the fluid carried by the line is gas, the escape thereof renders the entire operation rather hazardous, and explosions and fires occasionally have occurred.

Valved T's in addition to their advantage of permitting the connection of a service line to a main to be effected without the aforementioned hazards, possess the additional advantage of permitting flow from the main to the service pipe to the shut off at any time, after the connection has been made, in order to make repairs of extensions to the service pipe. This is an important function, and one which is extremely desirable in a service T.

Therefore, it is an object of this invention to provide an improved service T which is less expensive than a valve service T and which may be threaded into a tapped opening in a main and have a service pipe connected thereto, all without escape of fluid to the atmosphere.

It is another object of this invention to provide a T of the type under consideration which, by appropriate known apparatus, may be used to shut off flow from the main to the service pipe.

It is still another object of this invention to provide an inexpensive service T of simplified design which may be machine inserted under pressure into a main and have a service pipe connected thereto without loss of pressure.

Other objects and advantages of the invention will be apparent from the following description and accompanying drawings, in which:

Figure 3 is a fragmentary vertical sectional view of the T shown in Figure 1 and illustrating the T attached to the main and having a service pipe connected thereto.

Figure 4 is a fragmentary vertical sectional view showing apparatus, for completing the connection of the service pipe to the main, mounted on the service T in operative relationship thereto.

Figure 6 is a vertical sectional view illustrating the T shown in Figure 5 after the same has been plugged and capped.

Figure 9 is a longitudinal sectional view of another modified form of service T embodying this invention.

Figure 10 is a view corresponding to Figure 7 but illustrating the use of the service T shown in Figure 9.

Figure 11 is a view of still another modified form of service T embodying this invention.

Figure 1:
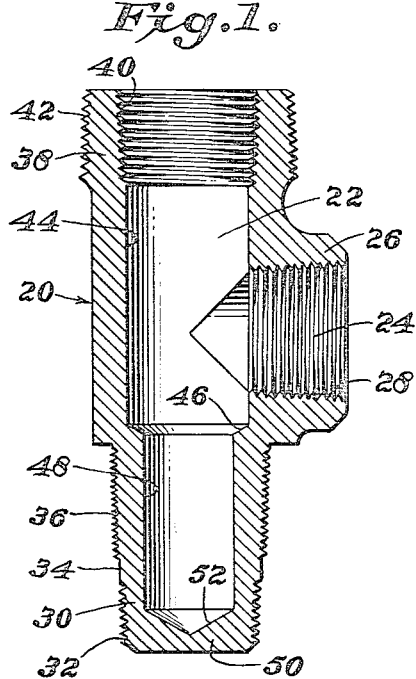
Figure 1 is a longitudinal sectional view of a service T embodying this invention.

Referring now to Figure 1 of the drawings, the service T 20 illustrated therein comprises a tubular member having an axial bore 22 and a lateral or side outlet 24 surrounded by an exterior boss 26 which may have interior threads 28 for the connection of a service pipe thereto. One end 30 of the T 20 is provided with exterior threads 32, preferably iron pipe threads, for connecting the T into a previously tapped opening in a thin walled main. Immediately adjacent the threads 32 there is an exterior smooth-surfaced cylindrical section 34 followed by relatively fine exterior threads 36. The other end 38 of the T is provided with interior and exterior threads 40 and 42, respectively, for purposes later described.

The bore 22 of the T 20 consists of a cylindrical section 44 of substantially the same diameter as the minimum diameter of the threads 40 and extending from the end 38 of the T just past the lateral outlet 24, at which point the bore is restricted to provide an interior shoulder 46 and extended as a reduced diameter section 48 to the other or inlet end 30 of the T. At the inlet end 30 of the T 20 the reduced bore section 48 is blocked by an integral web 50 having a conical depression 52 in its inner face for purposes later described.

Figure 2:
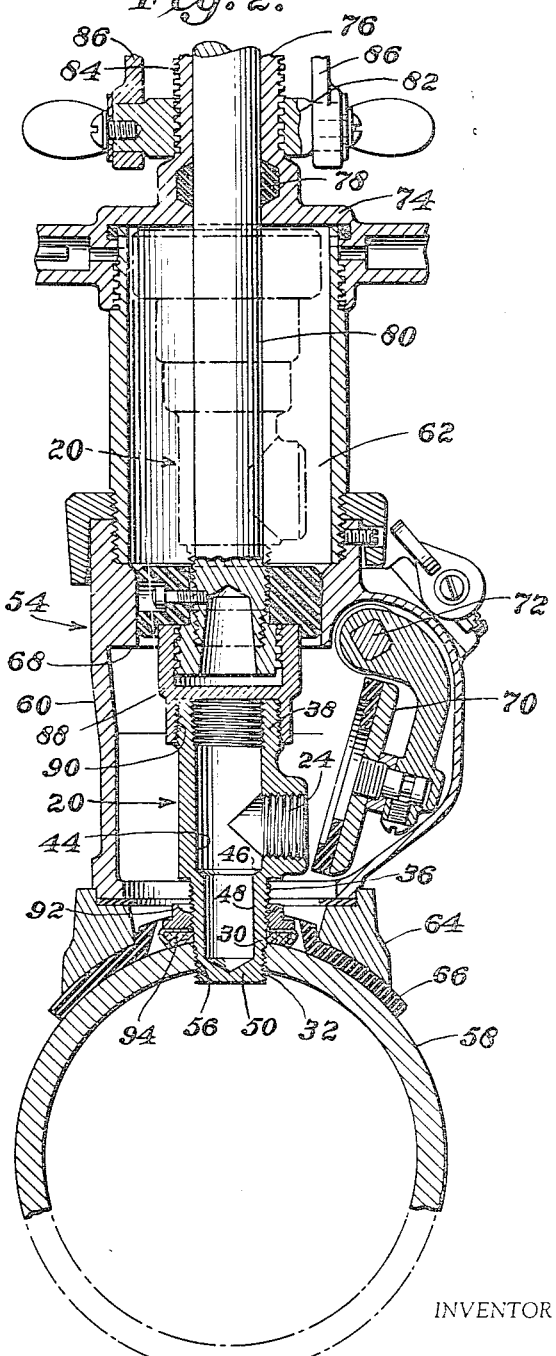
Figure 2 is a fragmentary vertical sectional view of apparatus for inserting the T shown in Figure 1 into a main without loss of pressure. The T is shown in operative position within the apparatus immediately after having been inserted into the main.

Referring now to Figure 2 of the drawings, there is shown a drilling and tapping apparatus 54 which also may be used to insert the T 20 into a previously tapped opening 56 in a main 58 without loss of pressure, i. e., escape of fluid from the main to the atmosphere. This apparatus is an improvement on the apparatus shown in Mueller et al. Patent No. 2,291,979, dated August 4, 1942, and is described in detail in the copending application of Mueller et al., Serial No. 272,354, filed February 19, 1952. Briefly, the apparatus 54 consists of a barrel 60 secured in radial relation to the main 58 and forming a pressure chamber 62. The inner end of the barrel 60 is open and seats on an apertured saddle 64 bearing against a suitable gasket 66, so that a portion of the wall of the main 58 is exposed to the chamber 62 within the barrel.

About midway between its ends, the barrel 60 is provided with a valve seat 68 for cooperation with a flop valve 70 disposed within the lower portion of the chamber 62, such valve being pivotally mounted by a transverse shaft 72 for operation by an exterior handle (not shown). The other or outer end of the barrel 60 is closed by a removable cap 74 having an outwardly extending cylindrical tubular extension 76 thereon provided with interior packing 78 for the reception of a boring bar 80 operable within the chamber 62. A feed collar 82 engages exterior threads 84 on the extension 76 and has a yoke 86 pivotally mounted thereon for engagement with a thrust collar (not shown) on the boring bar 80 in order to force the latter inwardly of the pressure chamber 62 within the barrel, all as described in greater detail in the aforementioned patent and copending application.

By use of this apparatus 54 with an appropriate drilling and tapping tool (not shown), the threaded aperture 56 may be made in the side of the main 58 without loss of pressure, as described more fully in the aforementioned patent and copending application. Thereafter, the tool is retracted into the upper portion of the chamber 62 above the valve seat 68, the flop valve 70 closed, the cap 74 removed, the drilling tool replaced with a carrier member 88 having a threaded socket 90 for supporting the T 20 on the end of the boring bar 80, and the cap replaced to support the T within the upper portion of the chamber, as illustrated by the dotted lines in Figure 2. The flop valve 70 then is reopened and the boring bar 80 advanced until the threads 32 on the inlet end 30 of the T 20 engage those of the tapped opening 56 in the main 58. Rotation of the boring bar 80 then threads or inserts the T 20 relatively tightly into such opening 56. Reverse rotation of the boring bar 80 then unthreads the same from the carrier member 88. Since the tapped aperture 56 in the main 58 is now plugged by the T 20 and since flow cannot occur from the main through the T because of the integral web 50 locking the inlet end 30 of the latter, the apparatus 54 may be unfastened from the main and completely removed, after which a wrench may be applied to the T to tighten the same in the main and thereafter hold the T against rotation while the carrier member 88 is unscrewed from the end 38 of the T.

The inserting operation has been described thus far with reference to a relatively thin-walled main 58 and it has been found in actual practice that for such a main there usually are insufficient threads in engagement between the T 20 and the tapped aperture 56 in the main to make an effective seal. Hence, before positioning the T 20 within the chamber 62 of the drilling, tapping, and inserting apparatus 54, a follower nut 92 is threaded onto the threads 36 of the T and a compressible resilient gasket 94 is mounted on the smooth cylindrical exterior section 34 of the T in relatively tight frictional engagement therewith to prevent the gasket from dropping off the T when the latter is suspended in inserting position on the end of the boring bar 80. After the T 20 has been inserted and the inserting aparatus 54 removed, the follower nut 92 is tightened against the gasket 94 to press the latter tightly against the exterior surface of the main 58 around the T to thus positively assure a tight seal. The constructional details of the follower nut 92 and gasket 94 are described in greater detail in the patent to Simpson, No. 2,265,703, dated December 9, 1941.

Referring now to Figure 3 of the drawings, after the T 20 has been installed in the main 58 as described above, a short nipple 96 having a chamfered outer end is tightly threaded into the side outlet 24 of the T. A service pipe 98 may then be welded, as at 100, to the chamfered end of the nipple 96. It will be realized that, in place of this nipple and weld connection, as an alternative construction (not shown) the service pipe 98 may be exteriorly threaded and directly screwed into the side outlet 24 of the T. The service pipe 98 then may be completely installed and tested for leaks by using the open end 38 of the T 20 for introduction of test pressure into the service pipe.

Referring now to Figure 4 of the drawings, in order to complete the service pipe connection to the main, 58, the integral web 50, blocking the inlet end 30 of the T 20, must be removed to permit flow from the main through the T into the service pipe 98. This is accomplished by a drilling and plugging apparatus 102, the structure and operation of which are described in detail in the patent to Mueller No. 1,996,345, dated April 2, 1935. Briefly, such apparatus 102 consists of a gate valve 104 threaded onto the outer end 38 of the inserted T 20. Connected into the other end of the gate valve 104 is an adapter sleeve 108 to the upper end of which is connected a feed sleeve 110 upon which is threadedly mounted a feed collar 112 having a yoke 114 pivotally mounted thereon and engageable with a thrust collar (not shown) on a boring bar 116 which extends through a stuffing box 118 at the outer end of the feed sleeve.

A drill 120 of somewhat smaller diameter than the restricted bore section 48 of the T 20 is connected into a threaded socket 121 in the inner end of the boring bar 116 and, after the valve 104 is opened, advanced into centering engagement in the conical depression 52 in the inner face of the web 50 of the T 20. Thereafter, rotation of the boring bar 116 serves to drill an aperture 122 (Figure 5) completely through the web 50 and form an inside shoulder 123. Hence, upon retraction of the drill 120 flow will take place from the main 58 through the T 20 and into the service pipe 98.

Figure 5:
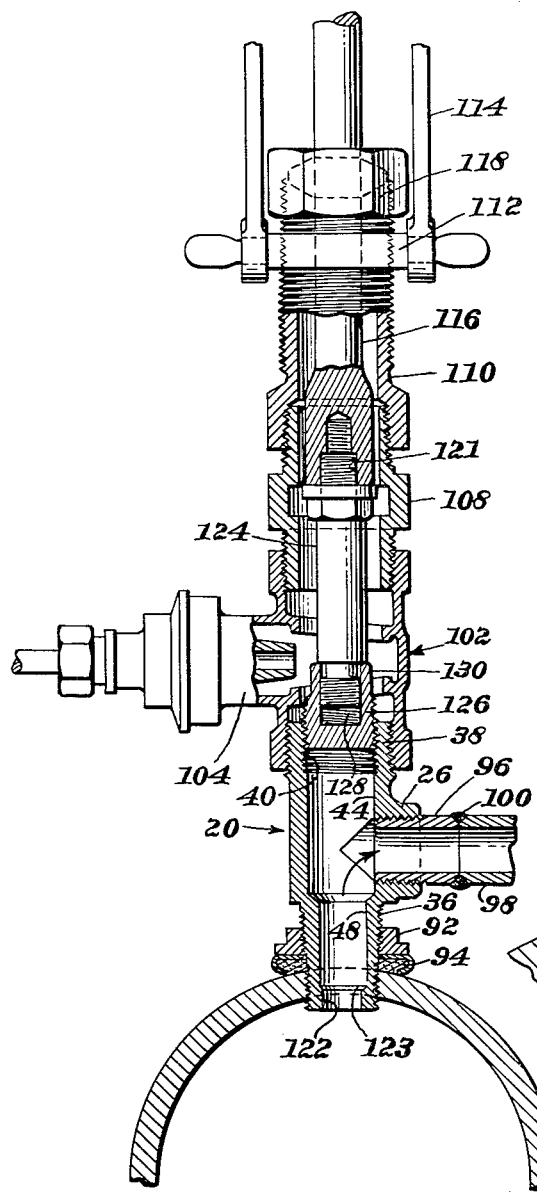
Figure 5 is a fragmentary vertical sectional view corresponding to Figure 4 and illustrating the final step in the operation of connecting the service pipe to the main.

After the boring bar 116 has been retracted, the gate valve 104 is closed and the feed sleeve 110 removed for replacement of the drill 120 with a plug inserting tool 124 shown in Figure 5. The construction and operation of this tool 124 are described in detail in the aforementioned Mueller Patent No. 1,996,345. It is sufficient to state that a threaded plug 126 having an outer threaded socket 128 is carried on the exteriorly threaded inner end of the tool 124, so that upon opening the gate valve 104 the boring bar 116 may be advanced to engage the exterior threads on the plug 126 with the interior threads 40 in the end 38 of the T 20. Rotation of the boring bar 116 then serves to thread the plug 126 into the T. When the T 20 has been so plugged, a sudden reverse rotation of the boring bar 116 will serve to unthread the tool 124 from the plug 126 because of a design difference in pitch between its exterior and interior threads. The drilling and plugging apparatus 102 may then be completely removed and the plug 126 tightened into the T 20 by engagement of the squared outer end 130 (Figure 6) of the plug 126 by an appropriate wrench.

Thereafter, a cap 132 is threaded onto the T in engagement with its exterior threads 42, as illustrated in Figure 6. The cap 132 not only provides a double seal against possible leakage from the T, but also protects the threads 42 for future use. This completes the connection of the service line 98 to the main 58 and such connection may remain undisturbed in safe operating condition for any desired period of time.

Figure 7:
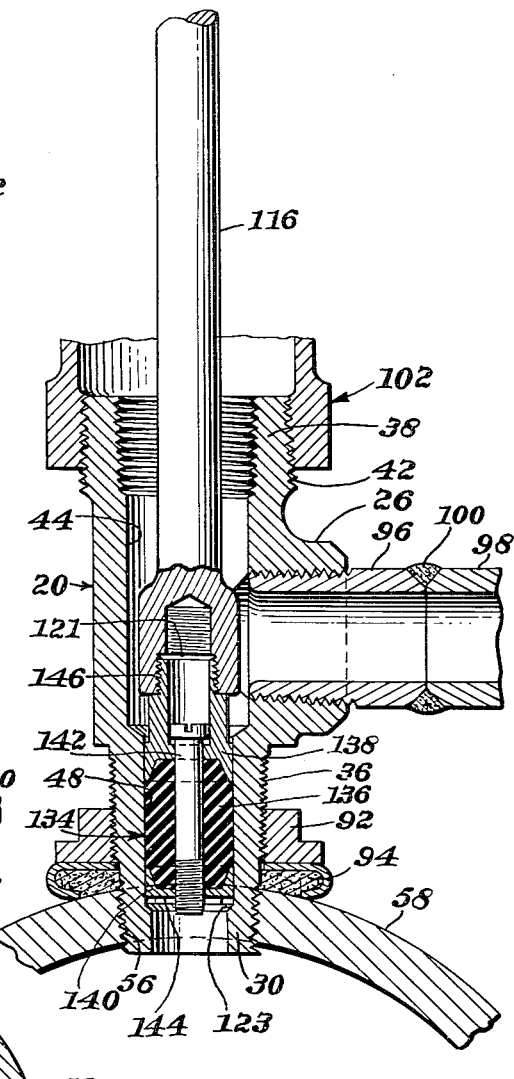
Figure 7 is an enlarged fragmentary vertical sectional view of the T illustrated in Figure 6 and showing the use of an expansible stopper for shutting off the flow from the main to the service pipe.

If at any time in the future, however, it should become necessary to shut off flow from the main 58 to the service pipe 98, in order to enable repairs to be made to the latter or the same to be extended, there is illustrated in Figure 7 apparatus for accomplishing such result without loss of pressure. As shown in this figure, the cap 132 is first removed from the T 20 and the drilling and plugging apparatus 102 again connected to the exterior threads 42 of the T. By means of this apparatus 102 and using an extracting adapter tool (not shown), described in detail in the aforementioned patent to Mueller, No. 1,996,345, the plug 126 is unthreaded and removed from the T 20. Utilizing the same apparatus 102, an expansible stopper 134 may be advanced through the T 20 into the restricted bore section 48 thereof.

This expansible stopper 134, which is similar to that shown in the patent to Larry et al., No. 2,171,577, September 5, 1939, consists of a cylindrical body 136, preferably of rubber or the like, having tapered ends and an outer diameter only slightly less than that of the restricted bore section 48. The body 136 is carried by spaced end caps 138 and 140, of substantially the same diameter as the relaxed body. The outer cap 138 has an axial bore extending therethrough and provided at its inner end with a shoulder on which seats the head of a screw 142 which passes through a central axial opening in the body 136 and is threaded into the inner cap 140. The threaded end of the screw 142 extends through the cap 140 which is retained on the screw by a locking or cotter pin 144 disposed in a diametrical kerf in the underside of the inner cap. The upper portion of the outer cap 138 has a reduced exteriorly threaded tubular extension 146 for reception within the threaded socket 121 on the end of the boring bar 116 of the drilling and plugging apparatus 102.

In use, the stopper 134 is advanced by the boring bar 116 into the restricted bore section 48 of the T until the inner cap 140 seats on the inside shoulder 123 at the inner end of such bore section. Further inward movement of the boring bar 116 forces the outer cap 138 inwardly against the rubber stopper body 136 to thereby expand the latter into sealing engagement with the walls of the restricted bore section 48 and positively stop flow from the main 58 through the T 20 into the service pipe 98. During operation of the stopper 134 it will be noted that since only the inner end of the screw 142 is threaded, the outer cap 138 may slide freely thereon during expansion, and also during contraction, of the rubber stopper body 136.

After the repairs or extensions have been made to the service pipe 98, the boring bar 116 is retracted to relieve the compression on the stopper body 136 and permit it to contract. Thereupon the stopper 134 may be pulled up into the drilling and plugging apparatus 102, the gate valve 104 closed, and the stopper removed from the apparatus. Thereafter, the T 20 may be replugged and capped by the apparatus and procedures previously described.

Figure 8:
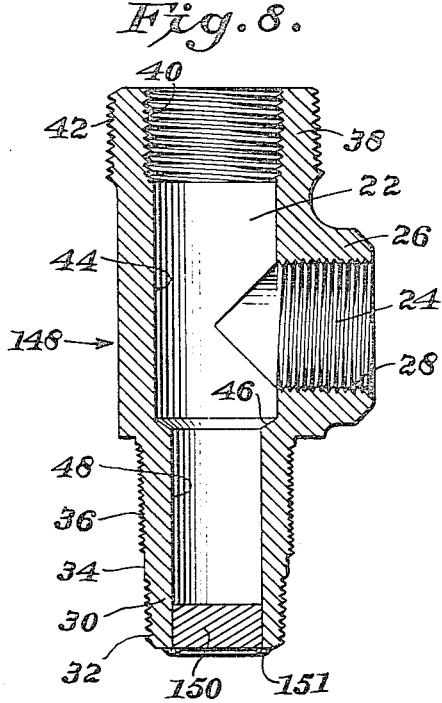
Figure 8 is a longitudinal sectional view of a modification of a service T embodying this invention.

Referring to Figure 8 of the drawings, there is shown a modified form of service T 148 which corresponds in all respects to the T 20 shown in Figure 1 except that the inlet end 30 of the T 148 is blocked by a metal plug 150 that is welded in place, as at 151, and which may be subsequently drilled or cut through in the same manner as the integral web 50 in the T 20. By the use of such a metal plug 150, conventional T's may be so plugged and used in accordance with the foregoing procedure to connect a service line to a main without loss of pressure, whereas the T 20 shown in Figure 1 must be specially made. In some instances a plug of appropriate cementitious material may be used for such purpose instead of a metal plug.

Referring now to Figures 9 and 10 of the drawings, there is shown a modified form of a T 152 embodying this invention for insertion into a tapped aperture in a thick-walled main, such as the main 154 shown in Figure 10. For this purpose the exterior threads 156 at the inlet end 158 of the T 152 and the threads in the tapped aperture 160 in the main 154 are of sufficient axial extent to form a tight seal without using a compressible gasket and a follower nut as in the T 20 illustrated in Figures 2 through 7. Absent the necessity of follower-nut-receiving threads, that section of the T 152 between its lateral outlet 162 and inlet end 158 may be of shorter axial extent, to thereby shorten the overall length of the T. The restricted bore section 164 of the T 152 is correspondingly short and, hence, of insufficient length for the operative reception of a rubber stopper. In order to overcome this difficulty, the larger bore section 166 of the T 152 is extended toward the inlet end 158 sufficiently beyond the lateral outlet 162 for the operative reception of a rubber stopper 168 within the larger bore section to shut off flow from the inlet end 158 of the T to the side outlet 162 thereof. The inlet end 158 of the T 152 is blocked by an integral web 170 similar in all respects to the web 50 of the T 20 shown in Figure 1.

In use, the T 152 is inserted in the tapped opening 160 in the main 154 and drilled through, plugged, and capped in exactly the same manner as has been heretofore described for the installation of the T 20 shown in Figure 1. In this connection it will be noted that in the absence of a compressible gasket and follower nut, the step of installing and tightening such gasket and nut is omitted. It also will be noted that the side outlet 162 is not interiorly threaded, but that the boss 172 surrounding such outlet is chamfered at its outer end to permit the service pipe 174 to be welded directly, as at 176, to such boss, as shown in Figure 10.

As further illustrated in this latter figure, the construction of the stopper 168, which may be used in the T 152 to shut off flow from the main 154 to the service pipe 174, is identical to that of the stopper 134 illustrated in Figure 7. The stopper 168, however, is proportioned for operative reception within the larger bore section 166 of the T so that the inner cap 140 seats on the shoulder 178 formed at the junction of the two bore sections 164 and 166. It also will be noted that because of the extension of the larger bore section 166 beyond the lateral outlet 162, the inner cap 140 is disposed sufficiently beyond such outlet that the latter is covered or blocked solely by the rubber stopper body 136. Hence, upon expansion of the stopper 168 by inward movement of the boring bar 116, in exactly the same manner as described with respect to Figure 7, the rubber body 136 sealingly engages the walls of the larger bore section 166 surrounding the lateral outlet 162 to positively prevent flow from the main 154 through the T 152 into the service pipe 174.

The modified form of T 180 shown in Figure 11 is substantially the same as the T 152 shown in Figure 9. The boss 182 surrounding the side outlet 184 of the T 180, however, is provided with exterior threads 186 for the threaded connection of a service line thereto. Additionally, the web 188 blocking the inlet end 190 of the T 180 is moved outwardly within the restricted bore section 192 so that the inner face of such web blocks the inner end of the larger bore section 194. Therefore, it will be seen that in T's of the type shown in Figures 9 and 11, wherein the larger bore section is constructed for operative reception of a stopper, the web blocking the inlet end of the T may be located at any position along the length of the restricted bore section of the T.

In all of the T's shown and described it will be noted that a machined bore section is provided for operative reception of an expansible stopper, such smooth bore section not only cooperating with the stopper to provide a tight seal, but also preventing damage to the rubber stopper body.

It will thus be seen that the objects of this invention have been fully and effectively accomplished. It will be realized, however, that the specific embodiments of the invention illustrated and described to disclose the principles thereof may be changed in various respects without departing from such principles. Therefore, this invention includes all modifications which are encompassed within the spirit and scope of the following claims.

I claim:

1. The method of connecting a service pipe to a main and subsequently shutting off flow to the pipe, all without escape of fluid to the atmosphere, the steps comprising: drilling and tapping the main by a tool manipulative through a pressure chamber attached to the main; threading a service T into the tapped aperture in the main by a tool manipulative through the pressure chamber, said T having its through bore blocked by drillable means adjacent its inlet end; connecting a service pipe to the lateral outlet of said T; drilling a hole through the drillable means of smaller diameter than the T through bore by a tool manipulative through a pressure chamber attached to the T to leave an abutment shoulder; inserting an expansible stopper into the through bore of said T by a tool manipulative through the T-attached pressure chamber; and expanding said stopper by compression against said shoulder to shut off flow from the main.

2. The method of connecting a service pipe to a main and subsequently shutting off flow to the pipe, all without escape of fluid to the atmosphere, the steps comprising: drilling and tapping the main by a tool manipulative through a pressure chamber attached to the main; threading a service T into the tapped aperture in the main by a tool manipulative through the pressure chamber, said T having its through bore blocked by drillable means located between the inlet end of said bore and the lateral outlet of said T and said bore having a smooth-walled section of uniform diameter extending past said outlet toward said drillable means and terminating in an abutment shoulder; connecting a service pipe to said lateral outlet; drilling a hole through said drillable means by a tool manipulative through the pressure chamber; inserting an expansible stopper into said T bore section by a tool manipulative through the pressure chamber; and expanding the stopper by compression against said shoulder to shut off flow from the main.

3. The method of connecting a service pipe to a main without escape of fluid therefrom to the atmosphere and with provision for future shut-off, the steps comprising: drilling and tapping the main by a tool manipulative through a pressure chamber attached to the main; threading a service T into the tapped aperture in the main by a tool manipulative through the pressure chamber, said T having its through bore blocked by drillable means located between the inlet end of said bore and the lateral outlet of said T and said bore having a smoothwall section of uniform diameter extending from said drillable means towards the other end of said T; connecting a service pipe to the lateral outlet of said T; drilling a hole through the drillable means of a smaller diameter than said T bore section by a tool manipulative through a pressure chamber attached to said T in order to establish service and to leave an abutment shoulder facing the said T other end; and attaching a closure to said T other end by a tool manipulative through the T-attached pressure chamber, whereby at any time in the future said closure can be removed by a tool manipulative through a T-attached pressure chamber and a shut-off can be effected by inserting a stopper, that is expansible by axial compression, into said bore section by a tool manipulaitve through the T-attached pressure chamber and expanding the stopper into sealing engagement with the walls of said bore section by compressing the stopper against said abutment shoulder.

References Cited in the file of this patent
UNITED STATES PATENTS

| | | |
|---|---|---|
| 1,045,289 | Hill | Nov. 26, 1912 |
| 1,566,958 | Gill | Dec. 22, 1925 |
| 1,701,691 | Mueller | Feb. 12, 1929 |
| 1,861,314 | McAndrew | May 31, 1932 |
| 1,944,518 | Lovekin | Jan. 23, 1934 |
| 1,960,272 | Lovekin | May 29, 1934 |
| 1,996,345 | Mueller | Apr. 2, 1935 |
| 2,108,068 | Larry | Feb. 15, 1938 |
| 2,250,244 | Yancey | July 22, 1941 |
| 2,257,199 | Sloan | Sept. 30, 1941 |
| 2,641,491 | Mueller | June 9, 1953 |